United States Patent
Riser et al.

(10) Patent No.: US 12,031,274 B2
(45) Date of Patent: Jul. 9, 2024

(54) HIGH CATIONIC STARCH AS A PROMOTER IN AKD SIZING EMULSIONS

(71) Applicant: Kemira Oyj, Helsinki (FI)

(72) Inventors: Jennifer Riser, Atlanta, GA (US); Kirsi Terava, Kirkkonummi (FI); Timo Valkealaakso, Ruutana (FI); Jaakko Hiltunen, Kauniainen (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 17/565,898

(22) Filed: Dec. 30, 2021

(65) Prior Publication Data
US 2023/0212820 A1  Jul. 6, 2023

(51) Int. Cl.
| | | |
|---|---|---|
| *D21H 17/29* | (2006.01) | |
| *D21H 17/00* | (2006.01) | |
| *D21H 17/66* | (2006.01) | |
| *D21H 23/10* | (2006.01) | |

(52) U.S. Cl.
CPC ............. *D21H 17/29* (2013.01); *D21H 17/66* (2013.01); *D21H 17/74* (2013.01); *D21H 23/10* (2013.01)

(58) Field of Classification Search
CPC ........ D21H 17/29; D21H 17/66; D21H 17/74; D21H 23/10
See application file for complete search history.

(56) References Cited

U.S. PATENT DOCUMENTS

| | | | | |
|---|---|---|---|---|
| 5,620,510 | A * | 4/1997 | Mentzer | D21H 17/28 106/206.1 |
| 2009/0277355 | A1* | 11/2009 | Pawlowska | D06M 13/192 106/209.1 |
| 2010/0224339 | A1* | 9/2010 | Hakansson | C08L 3/08 106/206.1 |
| 2012/0067534 | A1* | 3/2012 | Buwono | D21H 23/14 162/164.6 |
| 2012/0125553 | A1* | 5/2012 | Lackinger | D21H 21/16 106/250 |
| 2016/0251804 | A1* | 9/2016 | Castro | D21H 17/66 428/537.5 |
| 2020/0291581 | A1 | 9/2020 | Valkealaakso et al. | |
| 2020/0385499 | A1 | 12/2020 | Lepo et al. | |
| 2021/0102343 | A1 | 4/2021 | Hietaniemi et al. | |

FOREIGN PATENT DOCUMENTS

| | | |
|---|---|---|
| CN | 111622013 | 9/2020 |
| WO | 9401619 | 1/1994 |
| WO | 0208514 | 1/2002 |

* cited by examiner

*Primary Examiner* — Robert S Jones, Jr.
*Assistant Examiner* — Jiangtian Xu
(74) *Attorney, Agent, or Firm* — Robin L. Teskin; Baker, Donelson, Bearman, Caldwell & Berkowitz PC

(57) ABSTRACT

A method for preparation of a starch-promoted alkyl ketene dimer (AKD) sizing emulsion is provided. The inventive method comprises adding a sizing promoter comprising high-charge cationic starch and polyaluminum chloride (PAC) to a stabilized AKD emulsion and further wherein addition of said sizing promoter comprising high-charge cationic starch and PAC is effected at ambient temperature, after emulsification, stabilization, and homogenization of said stabilized AKD emulsion; and prior to addition of the starch-promoted AKD sizing emulsion to papermaking furnish, pulp, or fiber stock.

9 Claims, 6 Drawing Sheets

HIGH CATIONIC STARCH AS A PROMOTER IN AKD SIZING EMULSIONS

FIELD OF THE INVENTION

The present invention generally relates to a method for preparation of starch-promoted alkyl ketene dimer (AKD) sizing emulsions for the manufacture of paper or board. More specifically, the invention relates to adding to a stabilized AKD emulsion a sizing promoter comprising high-charge cationic starch and polyaluminum chloride (PAC) to form a starch-promoted AKD sizing emulsion and further treating a fiber stock at the wet end of a paper machine with the starch-promoted AKD sizing emulsion.

BACKGROUND OF THE INVENTION

In papermaking and paper finishing, a sizing agent is often employed to provide desirable characteristics sought in the ultimate paper product. Sizing, or sizing property, is a measure of the resistance of a manufactured paper or paperboard product to the penetration or wetting by an aqueous liquid.

Sizing agents are internal additives employed during papermaking or external additives employed as coating agents during paper finishing that increase this resistance. Sizing agents may be various substances that are used to facilitate the water-resistant protection of a paper's surface. These substances are typically used to prevent fluids from seeping into the paper and to prevent ink from blurring due to contact with water.

Papermaking can be carried out under acidic, neutral, or alkaline pH conditions, and the selection of a sizing agent is usually dependent on the pH used. For example, rosin-derived sizing agents are typically used under acidic papermaking conditions. Under alkaline pH conditions, which are widely used in fine paper manufacturing applications, typical sizing agents include alkyl ketene dimers (AKD), alkenyl dimers, and acid anhydrides such as alkenyl succinic anhydrides (ASA).

Dispersions or emulsions of sizing agents are used in papermaking to give paper and paper board improved resistance to wetting and penetration by various liquids. The sizing dispersions are usually added to an aqueous suspension containing cellulosic fibers, optional fillers and various additives.

Stabilizing agents are often employed to enhance the stability of sizing agent emulsions. Promoting agents generally provide performance enhancement to the sizing emulsion, such as increased AKD retention or curing onto the fibers in the furnish.

Cationic starches are well known agents in papermaking. They are mainly used in the wet end of the paper machine, where they are added to the fiber stock before the paper machine headbox. For example, they may be used as dry strength and/or anti-dusting agents, or as components in retention compositions.

Cationic starches are commonly added to AKD during the emulsification process to provide enhanced stability and allow for enhanced stability and to facilitate retention in the papermaking system. In CN 105421145A, starch is added during the emulsification process. The starch serves as a stabilizer into which the molten AKD wax is added and homogenized. In CN 104499363, a traditional AKD emulsification procedure in which the starch is cooked in a vessel and the AKD is added either as a wax pellet or as molten wax and then emulsified and finally emulsion stabilizers and curing aids are added before cooling.

Cationic starches are added directly to the furnish. US7270727B2 describes adding to the pulp an optical brightener, sizing agent and amphoteric promoter resin or low molecular weight cationic starch. In WO 02/12622A1, starch is added separately, along with a sizing dispersion, to a suspension containing cellulosic fibers. Significant improvement in sizing can be observed only when the sizing promoter is added separately from the sizing dispersion to the cellulosic suspension.

When used in this manner, the starch does very little to provide any performance benefits for the AKD since it does not provide charge density or zeta potential, which is key to fiber adsorption and sizing performance.

It is accordingly a purpose of this invention to provide a method for use of cationic starch as a promoting agent which improves the charge density or zeta potential of stabilized AKD sizing emulsions.

It is an additional purpose of the present application to provide a method which improves the physical parameters of the promoted AKD sizing emulsion.

It is an additional purpose of this invention to provide a means for improving retention and cure rate of the AKD itself in the furnish and to improve the sizing and edgewick properties of the final papermaking product.

This present application discloses a method for employing high cationic starch as a promoting agent for stabilized AKD sizing emulsions. In this invention, high cationic starch is added along with polyaluminum chloride (PAC) to AKD post emulsification and before adding to the furnish. The inventive method satisfies a need for a cost effective and efficient promoter for sizing agents in the papermaking industry.

SUMMARY OF THE INVENTION

The present disclosure generally encompasses a method for preparation of starch-promoted alkyl ketene dimer (AKD) sizing emulsions for the manufacture of paper or board. This method may comprise adding to a stabilized AKD emulsion a sizing promoter comprising high-charge cationic starch and polyaluminum chloride (PAC).

In particular, the results disclosed herein demonstrate that a sizing promoter comprising high-charge cationic starch combined with PAC can be used to enhance the physical parameters and sizing performance of AKD emulsions and to increase the retention of AKD in papermaking furnishes, providing improved sizing at a lower dosage.

The subject methods for preparation of starch-promoted AKD sizing emulsions for the manufacture of paper or board afford one or more of the following advantages:
 (1) the inventive promoting agents, when added to a homogenous emulsion of AKD, may be transported and stored as a stabilized emulsion until promotion is needed;
 (2) the high-charge cationic starch may be added directly in liquid form as received;
 (3) the inventive method allows for the addition of higher nitrogen content starch at higher dosage by reducing the viscosity of the starch-promoted AKD emulsion by addition of PAC;
 (4) the inventive method allows for preparation of starch-promoted AKD sizing emulsions with improved zeta potential and particle sizes;

(5) the inventive method provides performance enhancements including improved AKD retention and curing rates; and (6) the inventive starch-promoted AKD sizing emulsions allow for production of paper or board with improved sizing and edgewick performance compared to unpromoted formulations and those promoted with conventional cationic resins.

The present disclosure also generally encompasses a method for preparation of a starch-promoted alkyl ketene dimer (AKD) sizing emulsion for the manufacture of paper or board. This method may comprise adding a combination of (a) a sizing promoter comprising high-charge cationic starch and (b) polyaluminum chloride (PAC) to a stabilized AKD emulsion.

In some embodiments, addition of said sizing promoter comprising high-charge cationic starch and PAC may be effected (i) at ambient temperature; (ii) after emulsification, stabilization, and homogenization of said stabilized AKD emulsion; and (iii) prior to addition of the starch-promoted AKD sizing emulsion to papermaking furnish, pulp, or fiber stock.

In some embodiments, the stabilized AKD emulsion may be a homogenized stable emulsion comprising AKD, water, a stabilizing agent comprising cooked cationic starch, and optionally additional stabilizing agents selected from cationic polyacrylamides, copolymers of dialkylamine(s) and epichlorohydrin; polydiallylmethylammonium chloride (poly-DADMAC); poly(acrylamide-N-propyltrimethylammonium chloride (polyAPTAC); poly(methacrylamide-N-propyltrimethyl ammonium chloride (poly-MAPTAC); polyamidoamine epichlorohydrin resin, polyethyleneimine; polyvinylformamide/polyvinylamine; a copolymer of acrylamide and DADMAC; a copolymer of acrylamide and APTAC; a copolymer of acrylamide and MAPTAC; and mixtures thereof.

In some embodiments, the sizing promoter comprising high-charge cationic starch may be formulated separately by a method selected from:
a) dissolving a dry high-charge cationic starch in water, steam cooking or pot-cooking, and cooling to ambient temperature to obtain a starch solution having percent solids ranging from 20% to 35% by mass; and
b) obtaining a liquid high-charge cationic starch solution having percent solids ranging from 20% to 35% by mass and a viscosity ranging from 5500 to 12000 cP.

In some embodiments, the sizing promoter comprising high-charge cationic starch:
a) may be selected from potato starch, waxy maize starch, tapioca starch, rice starch, wheat starch, barley starch, sweet potato starch, corn starch, and combinations thereof;
b) may have a percent nitrogen (% N) content ranging from 0.5% to 1.6% by mass;
c) may be added to said stabilized AKD emulsion to obtain a final starch dosage selected from the ranges comprising 1% to 7%, 2% to 6%, and 3% to 5% by weight on AKD, wherein % by weight on AKD refers to dry pounds of additive (e.g., starch) per dry pound of AKD in said stabilized AKD emulsion multiplied by 100%; and
d) may be added to said stabilized AKD emulsion at ambient temperature while agitating at a rate of 5000 rpm for a duration of 30 seconds followed by gentle stirring until thoroughly incorporated.

In some embodiments, PAC may be added as an aqueous solution after addition of said sizing promoter comprising high-charge cationic starch to obtain a final PAC dosage selected from the ranges comprising 2% to 20%, 5% to 16%, and 12% to 14% by weight on AKD and thoroughly incorporating to form a starch-promoted AKD sizing emulsion.

In some embodiments, the pH of said starch-promoted AKD sizing emulsion may be selected from the ranges comprising 1.0 to 7.0, 2.0 to 5.0, and 2.5 to 3.5.

In some embodiments, the method may further comprise obtaining a starch-promoted AKD sizing emulsion with improved sizing performance (e.g., Cobb sizing and edgewick performance) compared to unpromoted AKD sizing emulsions and AKD sizing emulsions promoted with polymeric cationic promoters selected from PolyDADMAC, PAE, cationic wet strength resins, and cationic starch with % N less than 0.5% by weight.

The invention also provides a starch-promoted AKD sizing emulsion obtainable by a method according to any of the foregoing.

The present disclosure also generally encompasses a process for the production of paper or board. In some embodiments, the process may comprise obtaining fiber stock comprising wood pulp, optionally fiber stock comprising a high content of recycled fibers and/or mill broke fibers, optionally a thick fiber stock, optionally containing process water from pulp, paper, or board production and treating said fiber stock at the wet end of a paper machine with a starch-promoted AKD sizing emulsion according to any of the foregoing.

The invention also provides a composition comprising fiber stock comprising wood pulp, optionally fiber stock comprising a high content of recycled fibers and/or mill broke fibers, and/or optionally a thick fiber stock, optionally containing process water from pulp, paper, or board production, which further comprises and/or has been treated with a starch-promoted AKD sizing emulsion according to any of the foregoing.

The present disclosure also generally encompasses a method for preparation of a starch-promoted alkyl ketene dimer (AKD) sizing emulsion for the manufacture of paper or board. This method may comprise:
a) forming a cooked starch by steam cooking or pot-cooking cationic starch to form a low viscosity aqueous starch solution;
b) adding to said cooked starch a hydrophobic internal sizing agent selected from AKD wax pellets and molten AKD and agitating to form a thoroughly homogenized emulsion;
c) diluting said homogenized emulsion with water, optionally treating with additional cationic polymer stabilizing agents, agitating to form a homogenized emulsion, and cooling to ambient temperature to form a stabilized AKD emulsion;
d) treating said stabilized AKD emulsion at ambient temperature with a sizing promoter comprising high-charge cationic starch to obtain a final starch dosage selected from the ranges comprising 1% to 7%, 2% to 6%, and 3% to 5% by weight on AKD while agitating at a rate of 5000 rpm for a duration of 30 seconds followed by gentle stirring until thoroughly incorporated; and
e) treating said thoroughly incorporated emulsion with an aqueous solution of PAC to obtain a final PAC dosage selected from the ranges comprising 2% to 20%, 5% to 16%, and 12% to 14% by weight on AKD and thoroughly incorporating to form a starch-promoted AKD sizing emulsion.

In some embodiments, the method may further comprise obtaining a starch-promoted AKD sizing emulsion with improved sizing performance (e.g., Cobb sizing and edgewick performance) compared to unpromoted AKD sizing emulsions and AKD sizing emulsions promoted with polymeric cationic promoters selected from PolyDADMAC, PAE, cationic wet strength resins, and cationic starch with % N content less than 0.5% by weight.

The invention also provides a starch-promoted AKD sizing emulsion obtainable by a method according to any of the foregoing.

The present disclosure also generally encompasses a process for the production of paper or board. This process may comprise obtaining fiber stock comprising wood pulp, optionally fiber stock comprising a high content of recycled fibers and/or mill broke fibers, optionally a thick fiber stock, optionally containing process water from pulp, paper, or board production and treating said fiber stock at the wet end of a paper machine with a starch-promoted AKD sizing emulsion according to any of the foregoing.

The invention also provides a composition comprising fiber stock comprising wood pulp, optionally fiber stock comprising a high content of recycled fibers and/or mill broke fibers, optionally a thick fiber stock, optionally containing process water from pulp, paper, or board production, which further comprises and/or has been treated with a starch-promoted AKD sizing emulsion according to any of the foregoing.

BRIEF DESCRIPTION OF THE DRAWINGS

The invention will be described in more detail with reference to appended drawings, described in detail below.

DETAILED DESCRIPTION OF THE INVENTION

Figure 1:
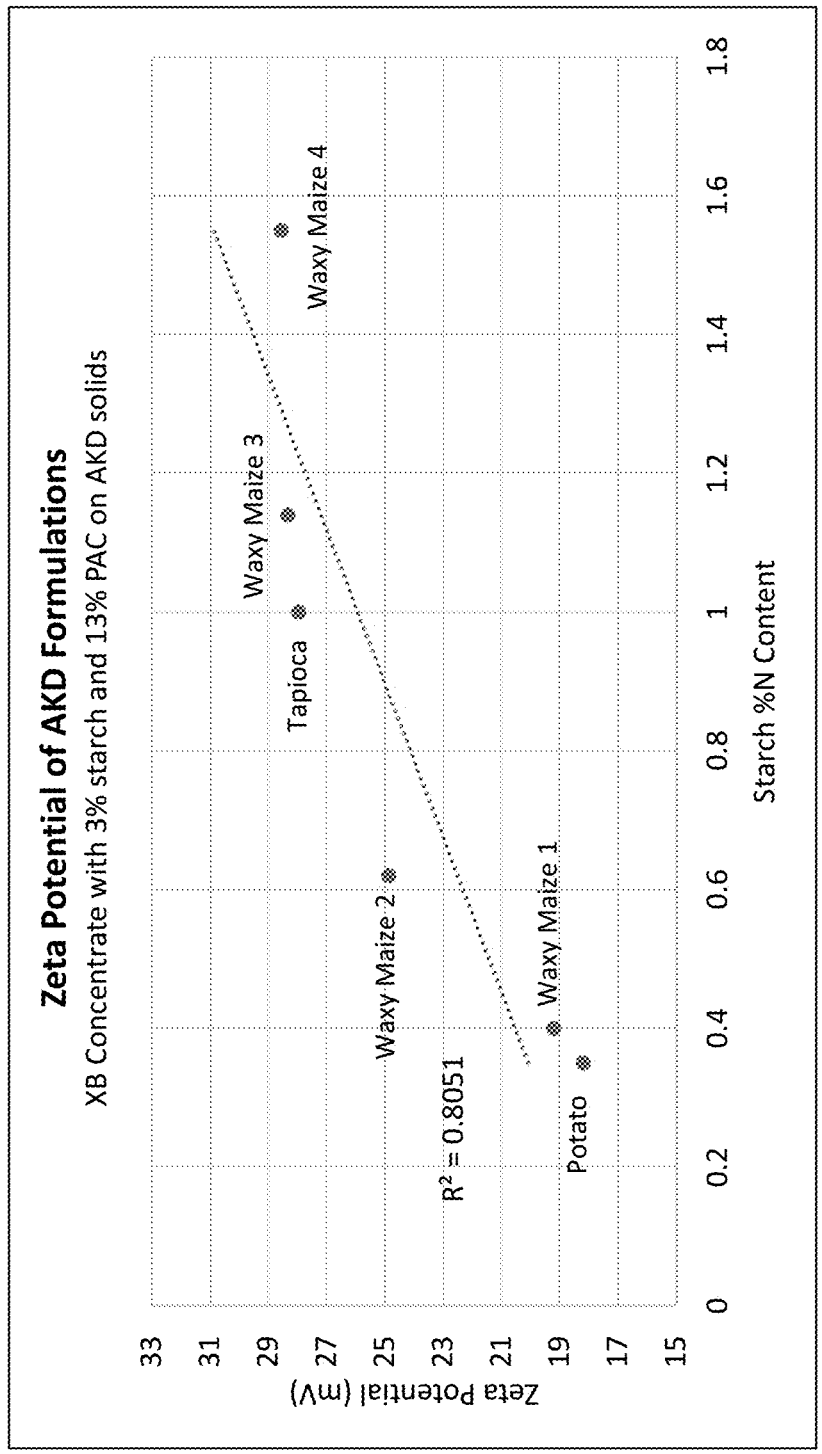
FIG. 1 provides an exemplary graph of variation of zeta potential of starch-promoted AKD formulations as a function of starch % N content according to Example 2.

Before describing the invention, the following definitions are provided. Unless stated otherwise all terms are to be construed as they would be by a person skilled in the art.

Definitions

As used herein, the singular forms "a", "and", and "the" include plural referents unless the context clearly dictates otherwise. All technical and scientific terms used herein have the same meaning as commonly understood to one of ordinary skill in the art to which this invention belongs unless clearly indicated otherwise.

As used herein, the terms "percent N content" and "% N content" refers to the molar percent of nitrogen substitution of cationic starch.

As used herein, the terms "stabilizer" and "stabilizing agent" generally refer to chemical additives which is added to an aqueous dispersion or emulsion of a non-water soluble sizing agent (e.g., AKD) to enhance the stability and facilitate long term storage of the emulsion as homogenous emulsion.

As used herein, the terms "promoter" and "promoting agent" generally refer to any additive added to a sizing agent which enhances the ability of the sizing agent to resist penetration or wetting of the finished paper product by an aqueous liquid. Promoting agents generally provide performance enhancement to the sizing emulsion, such as increased AKD retention or curing onto the fibers in the furnish. Promoting agents may also act to impart desirable physical properties to a sizing emulsion, such as smaller particle size and lower viscosity.

As used herein, the term "retention" refers to the efficiency with which small particles or chemical additives remain in the paper during its formation rather than staying with the white water.

As used herein, the term "zeta potential" refers to the average electrical potential at a hydrodynamic slip plane adjacent to a solid surface exposed to a liquid. Zeta potential data provide the papermaker with a way to predict how a furnish is likely to respond to the addition of cationic or anionic additives. The zeta potential is a good predictor of the magnitude of electrical repulsive forces between particles of known size and shape as a function of distance. Slurries of mineral fillers, sizing emulsions, etc., that have high absolute values of zeta potentials (greater than plus or minus 20 mV) are likely to remain in stable dispersion during storage.

As used herein, the terms "polyaluminum chloride" and "PAC" refer to a group of water-soluble, specific aluminum salts having the general formula $Al_nCl_{(3n-m)}(OH)_m$. PAC is used in the papermaking industry to increase drainage rates in neutral and alkaline processes, as a retention aid, to increase sizing efficiency and to reduce cationic demand.

As used herein, the terms "papermaking process" and "papermaking application" generally refers to any process in which any form of paper and/or paperboard product may be produced. For example, such processes include making paper products from pulp, such as methods comprising forming an aqueous cellulosic papermaking furnish, draining the furnish to form a sheet, and drying the sheet. The steps of forming the papermaking furnish, draining and drying may be carried out in any conventional manner generally known in the art. In some instances, papermaking processes and applications may comprise the use of one or more polymer solutions, wherein said polymer solutions may comprise one or more cationic starches, one or more DPAMs, one or more CPAMs, one or more GPAMs, one or more anionic dry polyacrylamides (ADPAM), and/or one or more polyaminoamide-epichlorohydrin (PAE) resins, for example as paper strengthening agents and/or wet-strength agents.

As used herein, the term "fiber" refers to the basic structural unit of paper or board.

As used herein, the terms "recycled fiber" and "recovered fiber", refer to paper, paperboard, and fibrous wastes from retail stores, office buildings, homes, manufacturing plants, and so forth, after they have passed through their end-usage as a consumer item. Manufacturing wastes include: dry paper and paperboard waste generated after completion of the papermaking process including by way of example: envelope cuttings, bindery trimmings, and other paper and paperboard waste resulting from printing, cutting, forming, and other converting operations; bag, box, and carton manufacturing wastes; mill wrappers, and rejected unused stock; and repulped finished paper and paperboard from obsolete inventories of paper and paperboard manufacturers, merchants, wholesalers, dealers, printers, converters, or others. In particular the term "recycled fibers" includes recycled fibers derived by processing of paper and other consumer cellulosic materials, e.g., paper, old corrugated containerboard (OCC), mixed office waste (MOW), old magazine (OMG), unbleached kraft pulp, neutral sulphite semi chemical (NCCS) pulp and/or mechanical pulp. Source materials for recycled fibers may be selected from old corrugated containerboard, mixed office waste, old newsprint, old magazines, double liner kraft, and any mixtures thereof. Mixed waste (MXW) denotes recycled mixture of recycled board, such as OCC, white lined chipboard and/or folding boxboard, and recycled paper, such as old newsprint, old magazines and/or office waste papers. Mixed office waste denotes recycled fiber material mainly containing copying papers, printer papers and offset papers. Double lined kraft denotes recycled fiber material comprising clean sorted unprinted corrugated cardboard cartons, boxes, sheet or trimmings, e.g. of kraft or jute liner. White lined chipboard (WLC) denotes multiply board comprising deinked fiber material and/or un-deinked recycled fiber material originating e.g., from OCC, mixed office waste or old newspapers (ONP) in or more of the layers. Presence of any of these recycled fiber materials in the fiber suspension usually decreases drainage and paper strength and provides a substantial load of starch, hydrophobic, and colloidal substances to the process.

As used herein, the term "OCC" refers to old corrugated cardboard and/or containerboard. Corrugated refers to those boxes where the materials are made from three separate layers of paper, two liners and a corrugated, or wavy, layer sandwiched between them. Brown paper bags are commonly accepted with OCC for recycling. The term OCC denotes recycled fiber material which have liners of test liner, jute or kraft, and may cover also double sorted corrugated containerboard (DS OCC).

As used herein, the terms "broke" or "mill broke" refer to paper, which during the paper making process becomes suitable only for repulping e.g., trimmings or paper that is out of specification. Broke is re-used material which never left the mill is not regarded as recycled or recovered. Broke is a valuable source of fiber and is recycled internally at the mill.

As used herein, the term "coated broke" refers to broke that contains coatings that are applied to the base sheet of paper as it is being manufactured. When the broke contains these coatings, it presents special problems in recycling to recover fiber values because the coatings introduce materials which would not normally be present in the original stock of fiber used to manufacture the base paper sheet. The coated broke may also contain dyes and/or other additives. In the present application coated broke includes surface-sized, dyed, and/or creped broke.

As used herein, the term "recycled fiber composition" generally refers to a composition comprising recycled cellulosic fibers, typically a composition wherein most or all are recycled fibers, e.g., at least 40, 50, 60, 70, 80, 90 or 100%.

As used herein, the term "fiber suspension" is understood as an aqueous suspension, which comprises fibers, preferably recycled fibers, and optionally fillers. For example, the fiber suspension may comprise at least 5%, preferably 10-30%, more preferably 11-19% of mineral filler. Mineral filler may be any filler conventionally used in paper and board manufacturing, such as ground calcium carbonate, precipitated calcium carbonate, clay, talc, gypsum, titanium dioxide, synthetic silicate, aluminum trihydrate, barium sulphate, magnesium oxide or their any of mixtures.

As used herein, the term "slurry" generally refers to a mixture of water, dissolved paper pulp, and optionally other soluble or insoluble components produced or added during the stock preparation phase of papermaking.

As used herein, the terms "furnish" or "papermaking furnish" generally refers to a mixture of cellulosic fibers, pulp, optional fillers, dyes, and water from which paper or board is made.

As used herein, the term "thick stock" generally refers to mixture of papermaking pulp and other materials with a consistency of about 1 to 5%.

As used herein, the term "thin stock" generally refers to a mixture of papermaking pulp and other materials, after having been diluted to a consistency below 1% with whitewater or other process water at a fan pump.

As used herein, the term "white water" generally refers to process water within a paper machine system, especially referring to water that is drained from paper as the sheet is being formed.

As used herein, the term "pitch" means natural hydrophobics and wood derivates, such as wood extractives, sterols, fatty acids, resin acids, fatty esters, including their salts and other forms thereof.

As used herein, the term "fines" generally may refer to mineral fractions that may comprise a particle diameter smaller than 125 P filter pore (e.g., particle diameter smaller than 0.76 micron or 200 mesh suspended particles).

As used herein, the term "sizing agent" generally refers to various substances that are used to facilitate the water-resistant protection of a material surface (e.g., paper, board, textile, or, composite material). These substances are typically used to prevent water or ink from seeping into the paper and to prevent ink from blurring due to contact with water.

As used herein, the term "surface sizing" generally refers to the application of a solution, often containing starch, to the surface of paper, usually in order to increase surface strength, and sometimes with addition of hydrophobic polymers or other material at the paper surface.

As used herein, the term "internal sizing" generally refers to treatment of the fiber slurry so that the paper will resist fluids.

As used herein, the terms "fixation", "fixing" and "fix" means that a substance is associated or attached onto the fibers at least temporarily or permanently.

As used herein, the term "flocculation" generally refers to the tendency for fibers to collect together in bunches in the presence of flow, and especially in the presence of retention aids; the same word also refers to the action of high-mass polymers in forming bridges between suspended colloidal particles, causing strong, relatively irreversible agglomeration.

The term "flocculant" may generally refer to a reagent that may bridge neutralized or facilitate coagulation of particles into larger agglomerates, typically resulting in more efficient settling. Flocculation process generally involves addition of a flocculant followed by mixing to facilitate collisions between particles, allowing for the destabilized particles to agglomerate into larger particles that can be removed by gravity through sedimentation or by other means, e.g., centrifugation, filtration.

As used herein, the terms "AKD" and "alkyl ketene dimer" refer to a family of organic compounds based on the 4-membered ring system of oxetan-2-one, which is also the central structural element of propiolactone and diketene. This alkaline sizing agent is synthesized from fatty acids. The most common form is a waxy solid material dispersed as small particles in a solution that contains a stabilizer. While many of the embodiments are described with reference to the paper process (e.g., sizing), it is understood that the embodiments, including compositions, processes, and methods, are not limited to applications involving paper making, but also can be applied to various other industries for which treatment with AKD is appropriate, such as textile manufacturing (e.g.), composite material manufacturing (e.g., as a compatibilizer for cellulose/polypropylene composite formation, regulating the porosity of composite materials, composite boards for flooring and decking), other applications of cellulose in manufacturing and materials science (e.g., structural optimization of cellulose nanofibers, generating super-hydrophobic wood surfaces), or to facilitate any desired interaction between hydrophilic carbohydrate polymers (e.g., wood fibers, cellulose fibers, etc.) and non-polar polymers, For the present applicant, the terms "contact time" or "residence time" refer to the amount of time between addition of a reagent (e.g., peroxyacid, ozone, dithionite, etc.) that contacts a mineral to be bleached, brightened, purified, or otherwise processed and removal of said reagent and/or addition of another reagent in a subsequent processing step.

As used herein, the terms "polymer" or "polymeric additives" and similar terms are used in their ordinary sense as understood by one skilled in the art, and thus may be used herein to refer to or describe a large molecule (or group of such molecules) that may comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by, for example, polymerizing, a particular monomer. Unless otherwise specified, a polymer may also comprise a "copolymer" that may comprise two or more different recurring units that may be formed by, for example, copolymerizing, two or more different monomers, and/or by chemically modifying one or more recurring units of a precursor polymer. Unless otherwise specified, a polymer or copolymer may also comprise a "terpolymer" which generally refers to a polymer that comprises three or more different recurring units. Any one of the one or more polymers discussed herein may be used in any applicable process, for example, as a sizing agent, stabilizer, or promoter.

As used herein, the term "monomer" generally refers to nonionic monomers, anionic monomers, cationic monomers, zwitterionic monomers, betaine monomers, and amphoteric ion pair monomers.

As used herein, the term "anionic monomers" may refer to either anionic monomers that are substantially anionic in whole or (in equilibrium) in part, at a pH in the range of about 4.0 to about 9.0. The "anionic monomers" may be neutral at low pH (from a pH of about 2 to about 6), or to anionic monomers that are anionic at low pH.

As used herein, the term "cationic monomer" generally refers to a monomer that possesses a positive charge or a monomer that is positively charged at a pH within the normal operating range of paper machine processes.

As used herein, the term "nonionic monomer" generally refers to a monomer that possesses a neutral charge.

As used herein, the term "water-soluble" generally refers to polymer products that are fully miscible with water. When mixed with excess of water, the cationic emulsion polymer in the polymer product is preferably fully dissolved and the obtained polymer solution is preferably free from discrete polymer particles or granules.

As used herein, the term "aqueous solution" or "solution" generally refers to a mixture of water and a water-soluble solute or solutes which are completely dissolved. The solution may be homogenous. When mixed with excess of water, the cationic emulsion polymer in the polymer product is preferably fully dissolved and the obtained polymer solution is preferably free from discrete polymer particles or granules.

As used herein, the term "aqueous suspension", "aqueous slurry", or "slurry" generally refer to a heterogeneous mixture of a fluid that contains insoluble or sparingly soluble solid particles sufficiently large for sedimentation. Suspensions and slurries of the present invention may also comprise some amount of solid particles, often termed colloidal particles, which do not completely settle or take a long time to settle completely.

As used herein, the terms "polyacrylamide" or "PAM" generally refer to polymers and co-polymers comprising acrylamide moieties, and the terms encompass any polymers or copolymers comprising acrylamide moieties, e.g., one or more acrylamide (co)polymers. In some instances, PAMs may comprise anionic PAMs (APAMs), cationic PAMs (CPAMs), and/or sulfonated PAMs (SPAMs).

As used herein, the terms "DPAM", "CPAM", and "GPAM" generally refer to cationic wet strength resins, which include PAM resins used in the manufacturing of moisture resistant paper grades such as liquid packaging, napkin, and paper towel. Positively charge resins electrostatically adsorb to negatively charged fines and fibers, increasing the global efficiency of the productive process. The term DPAM refers to polyacrylamides that are in dry form, e.g., powder form; CPAM refers to cationic polyacrylamides; GPAM refers to glyoxalated polyacrylamides As used herein, the term "Poly-DADMAC" refers to poly-diallylmethylammonium chloride, which is a fully charged, cationic polymer often used as the standard for cationic demand titrations.

As used herein, the terms "wet end of a paper machine" or "wet end" generally refer to the parts of a papermaking process between pulping (or bleaching) and wet-pressing of the paper.

As used herein, a "closed water system" refers to a papermaking process in which the amount of liquid effluent has been decreased, sometimes to zero (totally closed).

As used herein, the term "consistency" generally refers to percent oven dry mass in the stock, slurry, or furnish (i.e., 100%*oven dry mass/total mass).

The terms, "total solids" or "total suspended solids" are used interchangeably herein and generally refer the total amount or weight of suspended solids contained in oil sands or other sands comprising dispersion. "Total solids" or "total suspended solids" generally does not include dissolved solids.

As used herein, the term "ppm" refers to parts per million on the basis of milligrams of solute per liter of aqueous solution or slurry (e.g., mg/L).

As used herein, the terms "lbs/ton" or "#/T" denote pounds of dry mass of added material (e.g., additive, solute, and/or particle) per ton of suspended solids (e.g., weight of AKD per total dry ton of suspended solids).

As used herein, the terms "kg/t" or "kg/ton" denote kilograms of dry mass (additive, solute, and/or particle) per ton of slurry, stock, and/or furnish.

As used herein, the phrases "% by wt. on AKD" and "% by weight on AKD" denote pounds of dry pounds of additive (e.g., high-charge cationic starch, PAC, etc.) per pounds of AKD in the formulation, multiplied by 100%. For example, 10% by wt. on AKD refers to 10 pounds of additive in a formulation comprising 100 pounds of AKD.

DESCRIPTION OF THE INVENTION

The present disclosure generally encompasses a method for preparation of starch-promoted alkyl ketene dimer (AKD) sizing emulsions for the manufacture of paper or board. This method may comprise adding to a stabilized AKD emulsion a sizing promoter comprising high-charge cationic starch and polyaluminum chloride (PAC).

Sizing is a process that reduces the extent to which dry paper or dry board absorbs fluids. Sizing of paper or board improves water resistance, reduces permeability to fluids, and prevents ink and print from blurring. Two commonly used methods are internal sizing and surface sizing. Internal sizing is widely used in a large variety of papers, while surface sizing is generally used for production of higher grade papers.

Internal sizing involves treatment of the fiber slurry with sizing agents so that the paper will resist fluids. Internal sizing agents are added to fibers at the wet end of the papermaking process and generally form a strong bond to the fibers. Desirable characteristics of internal sizing agents include high hydrophobicity, high degree of retention on fibers, and uniform distribution throughout the fiber. Commonly used internal sizing agents include rosins, waxes, alkyl ketene dimers (AKD), and alkyl succinic anhydride (ASA). AKD and ASA sizing agents react with hydroxyl groups on cellulose fibers via esterification reactions, thereby anchoring to the fibers. The alkyl or alkenyl side chains of AKD and ASA impart hydrophobicity to the cellulosic material. Highly effective internal sizing agents reduce the amount fluid absorbed by paper in Cobb sizing tests and edge wicking tests.

Surface sizing involves addition of a film or thin layer of starch solution or other sizing material to the paper surface. Surface sizing agents are normally applied in a paper mill though the size press at dry end section. Surface sizing agents have both hydrophilic and hydrophobic ends. After forming a thin film on paper web, the hydrophilic end reacts with the surface of the paper leaving the hydrophobic tails to face outward. The thin film of retained sizing gent reduces paper dust; improves surface strength, printability, and water resistance of the paper. Surface sizing agent include modified starches, styrene maleic anhydride (SMA), styrene acrylic emulsion (SAE), styrene acrylic acid (SAA), ethylene acrylic acid (EAA), gelatin, and polyurethane (PUR). One effect of surface sizing chemicals is to ensure that printing ink stays on the surface and dries there, rather than being absorbed into the paper itself.

Zeta potential is a parameter that determines the electrical interaction between particles. A high zeta potential value, positive or negative, prevents flocculation. For sizing emulsions to be used in papermaking applications, zeta potential provides a predictive indication of fiber substantivity. Formulations with higher zeta potential should promote better on machine retention of AKD.

Cationic starches are well known agents in papermaking. They are mainly used in the wet end of the paper machine, where they are added to the fiber stock before the paper machine headbox. For example, they may be used as dry strength and/or anti-dusting agents, or as components in retention compositions.

Commercial cationic starches are normally available in moist powder form and have typically a degree substitution, DS, <0.055, i.e., they are low cationic starches. Low cationic starches are not soluble in cold water and tend to form low viscosity slurries when mixed with water. The formed slurry is relatively easy to pump. In order to make low cationic starch suitable for use in papermaking, it is usually mixed with water and the mixture is then cooked by using either jet cooking or pot cooking methods. For example, in jet cooking starch mixture is introduced into a jet cooker with steam. The cooking temperature in the cooker varies between 120-160° C., depending on the starch type. The cooking process time is typically around 1 to 2 minutes. Cooked starch is collected to a tank after steam separation and it may be considered as properly dissolved Starch.

Cationic starches, which have a degree of Substitution, DS, >0.35 are considered high cationic starches and they are relatively soluble in cold water. High cationic starches with degree of substitution >0.15 are readily soluble in cold water. However, these starches are difficult to dissolve, especially in large quantities, as they start to dissolve in water immediately, and part of the starch is already dissolved before all starch have not yet even entered the mixture. The result is that they easily form lumps of different size, instead of uniformly dissolving. They also often form with water, at industrially feasible concentrations, viscous gel-like masses, which are difficult, or even impossible to mix with normal existing agitating means in mixing tanks. Therefore, typically used starch concentrations are relatively low, less than 5 weight-%. In addition, transfer of such viscous gels is not possible with normal pumping equipment. Thus, high cationic starches are often not suitable for conventional starch dissolving techniques employing jet cooking or pot cooking. Complicated dissolving procedures employing, for example, powder dissolving units or high shear mixers, are required for dissolving high cationic starches, which have made the handling of industrial scale volumes of high cationic starch difficult, if not impossible.

In the current invention, it was surprisingly found that addition of high-charge cationic starches along with PAC to a homogenous AKD emulsion provides a high performance starch promoted AKD sizing emulsion with desirable physical properties and enhanced sizing ability.

Higher doses of high cationic starch have the potential to destabilize sizing emulsions and render them ineffective for short term storage and use. Thus, without addition of an additional viscosity modifying agent, there is an upper limit to cationicity (% N content) and dosage of the starch for promoting AKD emulsions before destabilizing the emulsion.

It was surprisingly found that, for a given starch dosage increasing the PAC dosage tends to decrease viscosity of the final emulsion. Therefore, a surprisingly beneficial effect of PAC on lowering the viscosity was discovered, allowing for higher % N content starch to be utilized as a promoter at higher doses.

In particular, the results disclosed herein demonstrate that a sizing promoter comprising high-charge cationic starch combined with PAC can be used to enhance the physical parameters and sizing performance of AKD emulsions and to increase the retention of AKD in papermaking furnishes, providing improved sizing at a lower dosage.

The subject methods for preparation of starch-promoted AKD sizing emulsions for the manufacture of paper or board afford one or more of the following advantages:

(1) the inventive promoting agents, when added to a homogenous emulsion of AKD, may be transported and stored as a stabilized emulsion until promotion is needed;
(2) the high-charge cationic starch may be added directly in liquid form as received;
(3) the inventive method allows for the addition of higher nitrogen content starch at higher dosage by reducing the viscosity of the starch-promoted AKD emulsion by addition of PAC;
(4) the inventive method allows for preparation of starch-promoted AKD sizing emulsions with improved zeta potential and particle sizes;
(5) the inventive method provides performance enhancements including improved AKD retention and curing rates; and
(6) the inventive starch-promoted AKD sizing emulsions allow for production of paper or board with improved sizing and edgewick performance compared to unpromoted formulations and those promoted with conventional cationic resins.

The present disclosure also generally encompasses a method for preparation of a starch-promoted alkyl ketene dimer (AKD) sizing emulsion for the manufacture of paper or board. This method may comprise adding a combination of (a) a sizing promoter comprising high-charge cationic starch and (b) polyaluminum chloride (PAC) to a stabilized AKD emulsion. In some embodiments, addition of said sizing promoter comprising high-charge cationic starch and PAC may be effected (i) at ambient temperature; (ii) after emulsification, stabilization, and homogenization of said stabilized AKD emulsion; and (iii) prior to addition of the starch-promoted AKD sizing emulsion to papermaking furnish, pulp, or fiber stock.

The AKD may be sourced as a wax, as pellets, as a molten liquid, or as a pre-stabilized emulsion. The hydrophobic alkyl groups extending from the beta-propiolactone ring of AKD may be carbon chains of any length greater than 2 carbons which may be linear, branched, cyclic, or combinations thereof. The carbon chains may be fully saturated, may contain various degrees of unsaturation, or mixtures thereof. Additionally, the AKD carbon chains may contain additional substitution, heteroatoms, and mixtures thereof. The AKD may be a single component or a mixture of various alkyl ketene dimers.

The stabilized AKD sizing emulsion may optionally contain other sizing agents which are amenable to promotion by the inventive method selected from, dispersed rosins size, wax based size, alkenyl succinic anhydride (ASA) emulsions, alkenyl ketene dimer (AnKD) size, other AKD emulsions, and mixtures thereof. The pH of the resulting starch-promoted sizing emulsion comprising any of the foregoing may be selected from the ranges comprising 1.0 to 7.0, 2.0 to 5.0, and 2.5 to 3.5, depending on the optimal pH for the sizing agent or mixtures thereof and the properties of the furnish to be sized. Higher pH values may also be utilized (e.g., pH >7.0), depending on pKa ranges for the various amine moieties present in high-charge cationic starch promoting agents. When said amine moieties are highly basic or permanently charged due to quaternization, higher operational pH values may be employed during promotion of sizing emulsions.

The high-cationic starch promoting agent and PAC may be added as a pre-combined mixture or added sequentially. In a preferred embodiment, the high cationic starch is added first to a stabilized AKD emulsion, followed by addition of PAC.

Additional promoting agents may also be added to the sizing emulsion itself or in the furnish to be sized. These additional promoting agents may be selected from cationic polymers including polyDACMAC, PAE resin, and other cationic promoting agents generally employed for papermaking applications.

In addition to PAC, other water soluble aluminum or ferric salts may be added to the sizing agent or directly to the furnish, including ferric aluminum chloride, alum, aluminum sulfate, sodium aluminate, and ferric sulfate and also other hexahydrates such as guanidinium and dimethylammonium salts of aluminum and/or iron or any other trivalent metal ion salt that is water soluble and compatible with papermaking processes.

In some embodiments, the stabilized AKD emulsion may be a homogenized stable emulsion comprising AKD, water, a stabilizing agent comprising cooked cationic starch, and optionally additional stabilizing agents selected from cationic polyacrylamides, copolymers of dialkylamine(s) and epichlorohydrin; polydiallylmethylammonium chloride (poly-DADMAC); poly(acrylamide-N-propyltrimethylammonium chloride (polyAPTAC); poly(methacrylamide-N-propyltrimethyl ammonium chloride (poly-MAPTAC); polyamidoamine epichlorohydrin resin, polyethyleneimine; polyvinylformamide/polyvinylamine; a copolymer of acrylamide and DADMAC; a copolymer of acrylamide and APTAC; a copolymer of acrylamide and MAPTAC; and mixtures thereof.

In some embodiments, the sizing promoter comprising high-charge cationic starch may be formulated separately by a method selected from:

a) dissolving a dry high-charge cationic starch in water, steam cooking or pot-cooking, and cooling to ambient temperature to obtain a starch solution having percent solids ranging from 20% to 35% by mass; and
b) obtaining a liquid high-charge cationic starch solution having percent solids ranging from 20% to 35% by mass and a viscosity ranging from 5500 to 12000 cP.

In some embodiments, the sizing promoter comprising high-charge cationic starch:

a) may be selected from potato starch, waxy maize starch, tapioca starch, rice starch, wheat starch, barley starch, sweet potato starch, corn starch, and combinations thereof;
b) may have a percent nitrogen (% N) content ranging from 0.5% to 1.6% by mass;
c) may be added to said stabilized AKD emulsion to obtain a final starch dosage selected from the ranges comprising 1% to 7%, 2% to 6%, and 3% to 5% by weight on AKD, wherein % by weight on AKD refers to dry pounds of additive (e.g., starch) per dry pound of AKD in said stabilized AKD emulsion multiplied by 100%; and
d) may be added to said stabilized AKD emulsion at ambient temperature while agitating at a rate of 5000 rpm for a duration of 30 seconds followed by gentle stirring until thoroughly incorporated.

In some embodiments, PAC may be added as an aqueous solution after addition of said sizing promoter comprising high-charge cationic starch to obtain a final PAC dosage selected from the ranges comprising 2% to 20%, 5% to 16%, and 12% to 14% by weight on AKD and thoroughly incorporating to form a starch-promoted AKD sizing emulsion.

In some embodiments, the pH of said starch-promoted AKD sizing emulsion may be selected from the ranges comprising 1.0 to 7.0, 2.0 to 5.0, and 2.5 to 3.5.

In some embodiments, the method may further comprise obtaining a starch-promoted AKD sizing emulsion with improved sizing performance (e.g., Cobb sizing and edgewick performance) compared to unpromoted AKD sizing emulsions and AKD sizing emulsions promoted with polymeric cationic promoters selected from PolyDADMAC, PAE, cationic wet strength resins, and cationic starch with % N less than 0.5% by weight.

The invention also provides a starch-promoted AKD sizing emulsion obtainable by a method according to any of the foregoing.

The present disclosure also generally encompasses a process for the production of paper or board. In some embodiments, the process may comprise obtaining fiber stock comprising wood pulp, optionally fiber stock comprising a high content of recycled fibers and/or mill broke fibers, optionally a thick fiber stock, optionally containing process water from pulp, paper, or board production and treating said fiber stock at the wet end of a paper machine with a starch-promoted AKD sizing emulsion according to any of the foregoing.

The invention also provides a composition comprising fiber stock comprising wood pulp, optionally fiber stock comprising a high content of recycled fibers and/or mill broke fibers, optionally a thick fiber stock, optionally containing process water from pulp, paper, or board production, which further comprises and/or has been treated with a starch-promoted AKD sizing emulsion according to any of the foregoing.

The present disclosure also generally encompasses a method for preparation of a starch-promoted alkyl ketene dimer (AKD) sizing emulsion for the manufacture of paper or board. This method may comprise:
a) forming a cooked starch by steam cooking or pot-cooking cationic starch to form a low viscosity aqueous starch solution;
b) adding to said cooked starch a hydrophobic internal sizing agent selected from AKD wax pellets and molten AKD and agitating to form a thoroughly homogenized emulsion;
c) diluting said homogenized emulsion with water, optionally treating with additional cationic polymer stabilizing agents, agitating to form a homogenized emulsion, and cooling to ambient temperature to form a stabilized AKD emulsion;
d) treating said stabilized AKD emulsion at ambient temperature with a sizing promoter comprising high-charge cationic starch to obtain a final starch dosage selected from the ranges comprising 1% to 7%, 2% to 6%, and 3% to 5% by weight on AKD while agitating at a rate of 5000 rpm for a duration of 30 seconds followed by gentle stirring until thoroughly incorporated; and
e) treating said thoroughly incorporated emulsion with an aqueous solution of PAC to obtain a final PAC dosage selected from the ranges comprising 2% to 20%, 5% to 16%, and 12% to 14% by weight on AKD and thoroughly incorporating to form a starch-promoted AKD sizing emulsion.

In some embodiments, the method may further comprise obtaining a starch-promoted AKD sizing emulsion with improved sizing performance (e.g., Cobb sizing and edgewick performance) compared to unpromoted AKD sizing emulsions and AKD sizing emulsions promoted with polymeric cationic promoters selected from PolyDADMAC, PAE, cationic wet strength resins, and cationic starch with % N content less than 0.5% by weight.

The invention also provides a starch-promoted AKD sizing emulsion obtainable by a method according to any of the foregoing.

The present disclosure also generally encompasses a process for the production of paper or board. This process may comprise obtaining fiber stock comprising wood pulp, optionally fiber stock comprising a high content of recycled fibers and/or mill broke fibers, optionally a thick fiber stock, optionally containing process water from pulp, paper, or board production and treating said fiber stock at the wet end of a paper machine with a starch-promoted AKD sizing emulsion according to any of the foregoing.

The invention also provides a composition comprising fiber stock comprising wood pulp, optionally fiber stock comprising a high content of recycled fibers and/or mill broke fibers, optionally a thick fiber stock, optionally containing process water from pulp, paper, or board production, which further comprises and/or has been treated with a starch-promoted AKD sizing emulsion according to any of the foregoing.

Having described the invention in detail the invention is further described in the following examples.

EXAMPLES

The following examples are presented for illustrative purposes only and are not intended to be limiting.

Example 1: Use of High Cationic Starch for the Preparation of a Starch Promoted AKD Sizing Emulsion To determine the effectiveness of high cationic starch as a promoting agent for AKD sizing emulsions, several formulations were prepared by addition of (i) cooked or liquid high cationic starch and (ii) polyaluminum chloride to stabilized AKD sizing emulsions as described below.

Preparation of a Stabilized-AKD Sizing Emulsion:

A stabilized AKD sizing emulsion was prepared by cooking starch (generally low viscosity, low charge waxy maize starch is preferred) using standard methods known in the art to form an aqueous starch stabilizing agent. To the cooked starch was added AKD in the form of AKD wax pellets or molten AKD wax to an AKD content ranging from 20-30%, and the mixture was homogenized. The resulting emulsion was then diluted with water and optionally additional stabilizers, agitated until homogenous, and then cooled to ambient temperature, e.g., approximately 22-27° C. The resulting stabilized AKD sizing emulsion is a homogenous, high solids emulsion, which may be stored for later use.

A portion of the stabilized AKD sizing emulsion was utilized for testing as an unpromoted AKD sizing emulsion. The remainder of the emulsion was used as a high-solids base material for treatment with a variety of high-charge cationic starch promoters as specified below.

Preparation of Starch-Promoted AKD Sizing Emulsions:

Cationic starch products were commercially sourced from existing vendors based on their extent of nitrogen substitution (% N content), which is a relative metric of quaternizable and basic nitrogen content and thus a metric of cationic charge. A solid potato starch and several liquid starch options were obtained and evaluated for performance as promotion agents for AKD emulsion formulations. The names, types, and properties of commercially sourced cationic starch products are listed in Table 1.

TABLE 1

Description and Properties of Cationic Starches

| Starch | % N | % Solids | Viscosity (#5 spindle, 25 rpm) |
|---|---|---|---|
| Potato | 0.35% | dry | n/a |
| Waxy Maize 1 | 0.40% | 25% | ~6000 |
| Waxy Maize 2 | 0.62% | 30% | ~12000 |
| Tapioca | 1.00% | 20% | ~6000 |
| Waxy Maize 3 | 1.14% | 30% | ~5500 |
| Waxy Maize 4 | 1.55% | 35% | ~5500 |

The cationic starches of Table 1 were formulated for addition to AKD emulsions as promoting agents.

Dry potato starch was cooked in a separate vessel under elevated temperatures to form an aqueous formulation. It was observed that the resulting cooked formulation should be gently cooled to ambient temperature prior to use as a promoting agent for AKD emulsions. Addition of the hot cooked starch formulation tended to destabilize the emulsion. Commercially available liquid starch formulations were utilized as received at ambient temperature.

Starch-promoted AKD sizing emulsions were then prepared by treating portions of the stabilized AKD sizing emulsion with each high cationic starch formulation at a starch dosage ranging from 1-7% by wt. on AKD at ambient temperature under moderate shear (5000 rpm) for a short duration (30 seconds). Afterward, the agitation was reduced to provide gentle stirring. The resulting emulsions were then dosed with polyaluminum chloride (PAC), which acts to lower viscosity, under gentle stirring to a final PAC dosage of 2-20% by wt on AKD. The pH of the resulting mixtures ranged from 2.5-3.5. The resulting starch-promoted AKD sizing emulsions were evaluated for formulation properties (e.g., zeta potential, mean particle size, viscosity) and internal sizing performance for papermaking applications on a variety of paper machine furnish types.

Example 2: The Effect of Nitrogen Substitution on Relative Performance of Starch-Promoted AKD Sizing Emulsions The effect of nitrogen substitution on relative performance of starch-promoted AKD sizing emulsions was determined by subjecting samples of starch-promoted AKD sizing emulsions to promotion with high-charge cationic starches of Table 1, which have various degrees of % N substitution, followed by treatment with PAC according to Example 1. Each formulation contained a final starch dosage of 3% by weight on AKD and a final PAC dosage of 13% by weight on AKD.

The resulting starch-promoted AKD sizing emulsions were then analyzed for zeta potential, which is a predictor of sizing performance in papermaking applications. Zeta potential is the parameter that determines the electrical interaction between particles, a high value, positive or negative, prevents flocculation. AKD formulations with higher zeta potential reliably promote better on machine retention of AKD. An exemplary graph of zeta potentials as a function of % N substitution is shown in FIG. 1.

Results indicate a strong positive correlation between zeta potential of starch-promoted AKD formulations and starch % N content. A zeta potential plateau was observed for starches with % N content greater than 1 (e.g., for Tapioca, Waxy Maize 3, and Waxy Maize 4). Because % N content is a metric of relative cationic charge, these results suggest that zeta potential is positively correlated with the amount of cationic charge in the starches of Table 1.

These results provide initial proof of concept that the inventive method for promotion of stabilized AKD sizing emulsions with high-charge cationic starch and PAC provides an unexpected enhancement in zeta potential, indicating a performance enhancement for papermaking applications. These results strongly suggest that formulation with a high-charge starch, such as Waxy Maize 3, will promote better on machine retention of AKD in produced paper or board.

Example 3: The Effect of Formulation Parameters on Particle Size for Starch-Promoted AKD Sizing Emulsions Sizing emulsions with smaller particle sizes are generally preferred for papermaking applications.

The effect of formulation parameters (e.g., starch product, starch dose, PAC product, PAC dose) on particle size was determined by preparing multiple formulations of starch-promoted AKD sizing emulsions according to Example 1. Formulations were prepared using (i) starch products according to Table 1 at final starch dosages ranging from 1% to 7% by weight on AKD and (ii) medium (40%) and medium-high (50%) basicity high basicity and low basicity PAC products (PAC 1 and PAC 2) at final PAC dosages ranging from 2% to 20% by weight on AKD.

Figure 2:
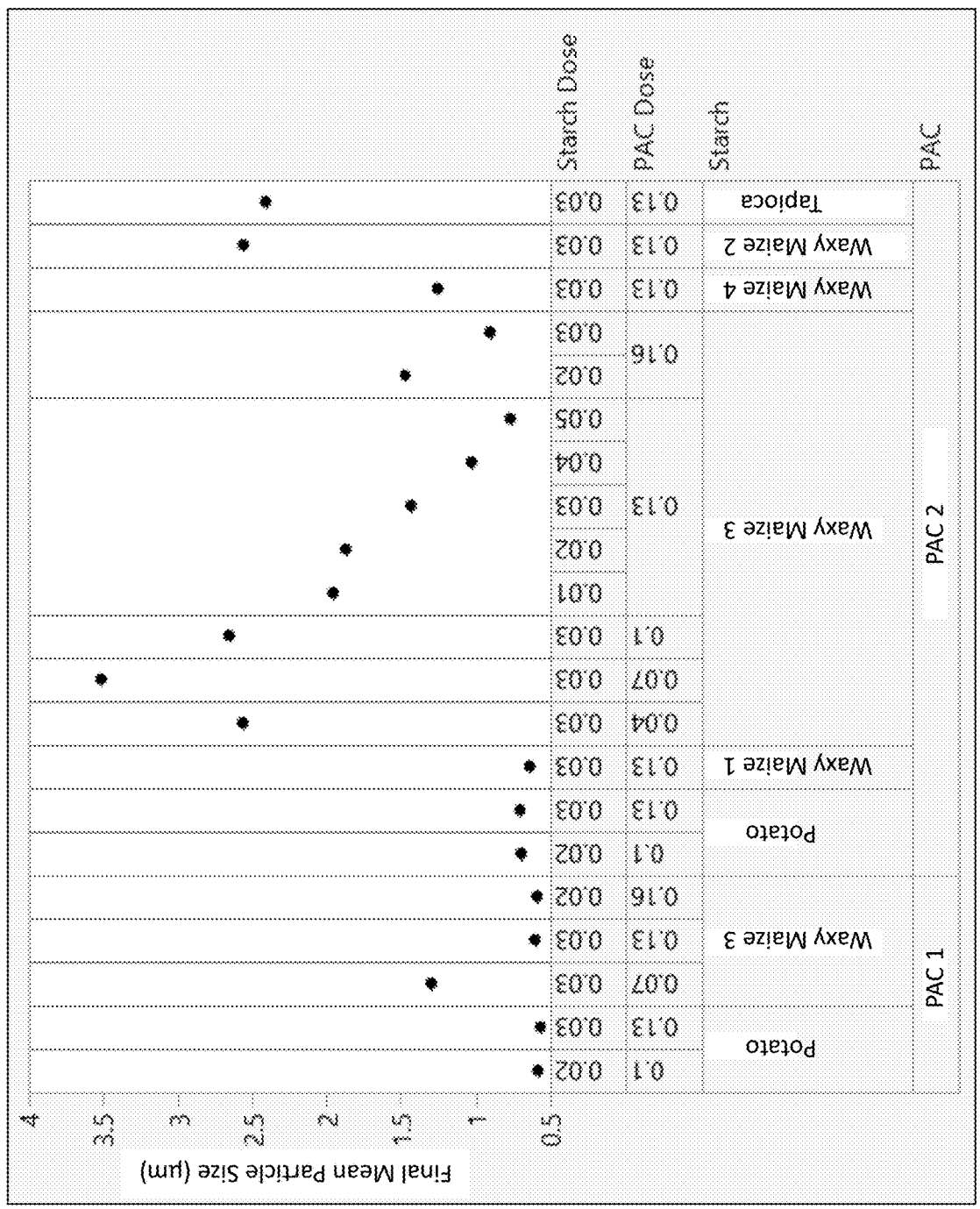
FIG. 2 provides an exemplary graph of final mean particle size of starch-promoted AKD formulations according to Example 3.

The resulting emulsions were analyzed for final mean particle size. An exemplary graph of particle size as a function of formulation parameters is shown in FIG. 2.

Results indicated that, for a given PAC dose (e.g., PAC 2, 13% by wt. on AKD), increasing the dosage of high-charge starch (e.g., Waxy Maize 3 dosed from 1% to 5% by wt. on AKD) tended to reduce particle size in the final starch promoted AKD emulsions, which is preferred for papermaking applications.

Results further indicated that treatment with PAC 1 tended to reduce particle size in the final starch promoted AKD emulsions, as compared to PAC 2.

These results provide proof of concept that increasing the dosage of a preferred high-charge starch (e.g., Waxy Maize 3) followed by treatment with PAC at dosage ranging from ~3% to 16% by wt. on AKD is beneficial for the inventive method of preparing starch-promoted AKD sizing emulsions.

Example 4: The Effect of Formulation Parameters on Viscosity of Starch-Promoted AKD Sizing Emulsions Due to stability concerns, sizing emulsions with lower viscosities are generally preferred for papermaking applications.

The effect of formulation parameters (e.g., starch product, starch dose, PAC product, PAC dose) on viscosity was determined by preparing multiple formulations of starch-promoted AKD sizing emulsions according to Example 1. Formulations were prepared using (i) starch products according to Table 1 at final starch dosages ranging from 1% to 7% by weight on AKD and (ii) PAC products selected from PAC 1 and PAC 2 at final PAC dosages ranging from 2% to 20% by weight on AKD.

Figure 3:
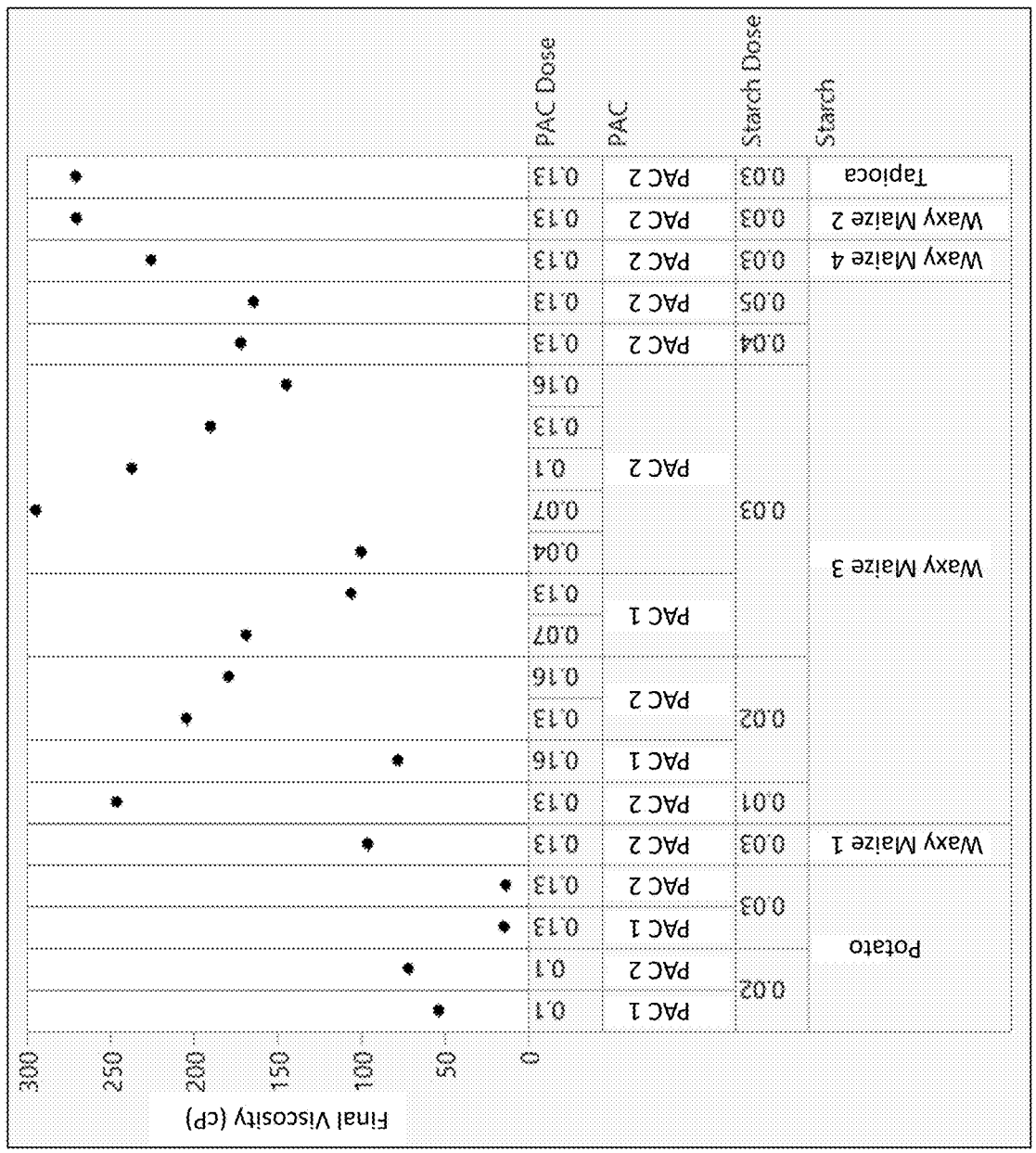
FIG. 3 provides an exemplary graph of final viscosity of starch-promoted AKD formulations according to Example 4.

The resulting emulsions were analyzed for final viscosity. An exemplary graph of viscosity as a function of formulation parameters is shown in FIG. 3.

Results indicate that, as the nitrogen content of cationic starch increases, an undesirable increase in viscosity of starch-formulated emulsions was observed. It is known in the art that, as the nitrogen content of cationic starch increases, the MW of the starch also tends to increase, which can cause an undesirable increase in viscosity of starch-formulated emulsions.

These results suggest that higher doses of high cationic starch have the potential to destabilize sizing emulsions and render them ineffective for short term storage and use. Thus, without addition of PAC, there is an upper limit to cationicity (% N content) and dosage of the starch for promoting AKD emulsions before destabilizing the emulsion.

Results further indicate that, for a given starch dosage (e.g., Waxy Maize 3 dosed at 3% by wt. on AKD), increasing the PAC dosage tends to decrease viscosity of the final emulsion.

These results demonstrate a surprisingly beneficial effect of PAC on lowering the viscosity, allowing for higher % N content starch to be utilized as a promoter at higher doses. This allows for production of starch-promoted AKD emulsions having higher zeta potentials and sufficient stability for effective storage and use in papermaking.

Example 5: Sizing Performance of Starch-Promoted AKD Sizing Emulsions on 100% OCC Furnish The sizing performance of inventive starch-promoted AKD sizing emulsions was evaluated on a North American, 100% OCC furnish having high conductivity, high alkalinity, and high calcium hardness. The 100% OCC furnish was treated with three starch-promoted AKD sizing emulsions prepared according to Example 1, wherein the cationic starch promoting agent was either a dry potato starch which was cooked and cooled prior to use (3AP13G, Potato Starch, PAC 2) or a liquid starch formulation which was used as received at ambient temperature (3FB13G, Waxy Maize 1, PAC 2; E04084A, Waxy Maize 3, PAC 1). The sizing performance was compared to an unpromoted stabilized AKD emulsion prepared according to Example 1 (544M, no promoter, no PAC), and AKD emulsions promoted with an industry standard promoting agent and PAC (C222, Potato Starch, PAC 2), a polyDADMAC promoting agent and PAC (E9389, polyDADMAC, PAC 2), PAC only (E12734A, PAC 2), PolyDADMAC and PAC (1B2M, polyDADMAC, PAC 1), and polyamideamine-epichlorohydrin (PAE) wet strength resin and PAC (4B2X, PAE, PAC 1).

Sizing emulsions were added to the furnish at dosages of 1.75 and 2.5 #/T, defined as pounds of emulsion per tons of total dry solids in the furnish.

Figure 4:
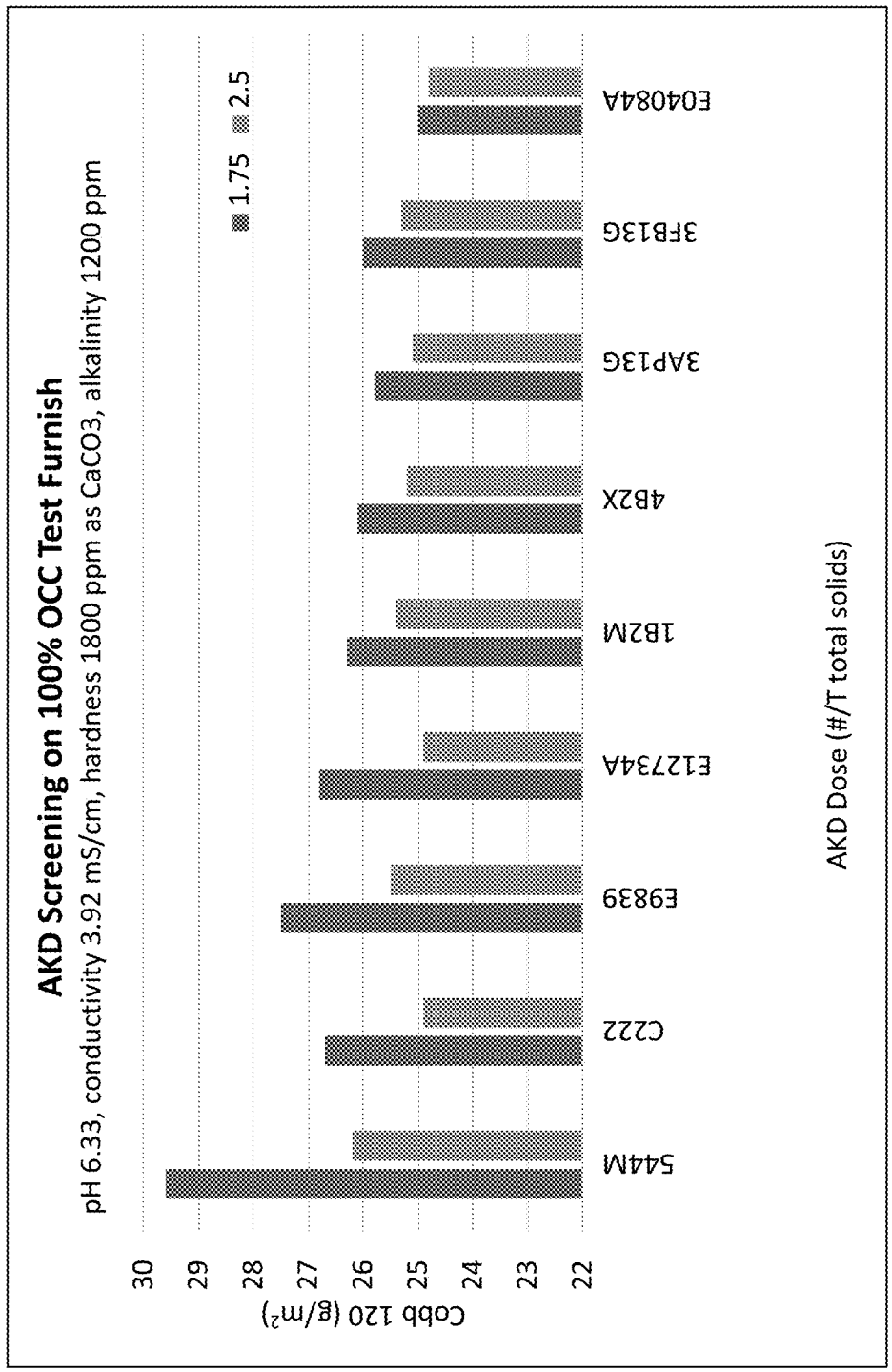
FIG. 4 provides an exemplary graph of Cobb sizing results from sheets prepared by sizing 100% OCC furnish with AKD formulations according to Example 5.

Sheets formed from the sized furnish formulations were analyzed by standard Cobb sizing test to determine the water absorptiveness of the sized paperboard materials. Cobb sizing test results are shown in FIG. 4.

A Cobb sizing test determines the mass in grams of water absorbed by a sample of sheet material of a standard surface area (typically one hundred square centimeters) in a specified time and under standardized conditions. Results are reported in grams of water absorbed per square meter of sheet material. Higher performance sizing emulsions produce sheets with lower absorptiveness.

Results indicate that the three inventive starch-promoted formulations (e.g., 3AP13G, 3FB13G, and E04084A) produced sheets with the best Cobb sizing response at both dosage levels compared to the unpromoted formulation and those promoted with polyDADMAC, PAE wet strength resin, and PAC only. Most notably and to surprising effect, the inventive formulation, E04084A (Waxy Maize 3, PAC 1) at low dose (1.75 #/T), out-performed or performed similar to all other formulations at high dose (2.5 #T).

These results provide initial proof of concept that the inventive method of adding high-charge cationic starch in combination with PAC to a stabilized AKD emulsion increases the retention of AKD in the paper furnish, thus giving better sizing performance in the finished sheet at a lower dose.

Example 6: Sizing Performance of Starch-Promoted AKD Sizing Emulsions on LPB Mid Ply Furnish The sizing performance of inventive starch-promoted AKD sizing emulsions was evaluated on a North American liquid packaging board (LPB) mid ply furnish.

The LPB furnish was treated with starch-promoted AKD sizing emulsions prepared according to Example 1, wherein the cationic starch promoting agent was a liquid starch formulation which was used as received at ambient temperature (E04084A, Waxy Maize 3, PAC 1). The sizing performance was compared to an unpromoted stabilized AKD emulsion prepared according to Example 1 (564M, no promoter, no PAC), and AKD emulsions promoted with other promoting agents (E9389, polyDADMAC, PAC 2; E12734A, PAC 2 only; E04082A, polyDADMAC, PAC 1; E04083A, PAE, PAC 1; and 16132E, low dose Waxy Maize 3, high dose PAC 1).

Sizing emulsions were added to the furnish at dosages of 3 and 4.5 #/T, defined as pounds of emulsion per tons of total dry solids in the furnish.

Figure 5A:
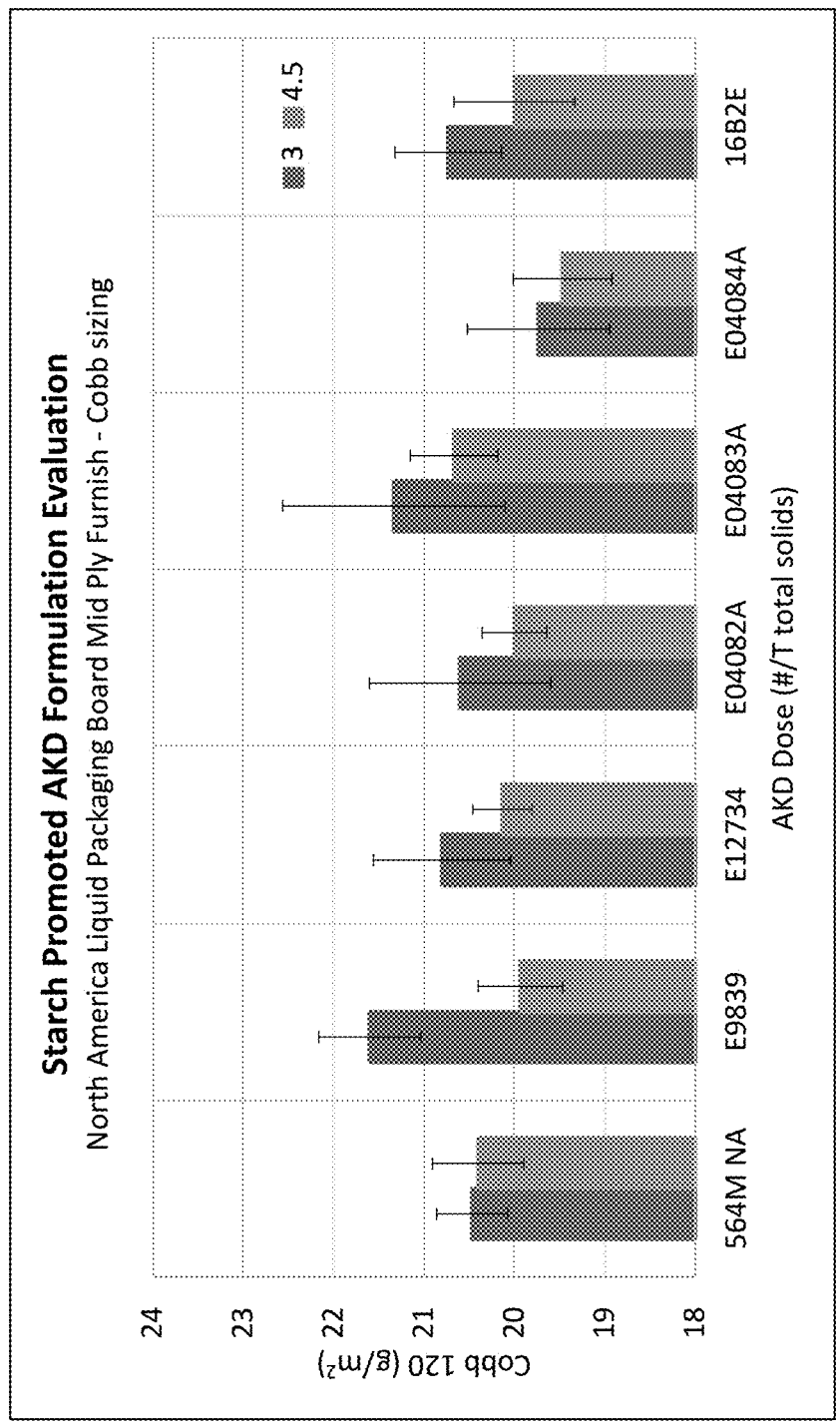
FIG. 5A provides an exemplary graph of Cobb sizing results from handsheets prepared by sizing liquid packaging board mid ply furnish with AKD formulations according to Example 6.
Figure 5B:
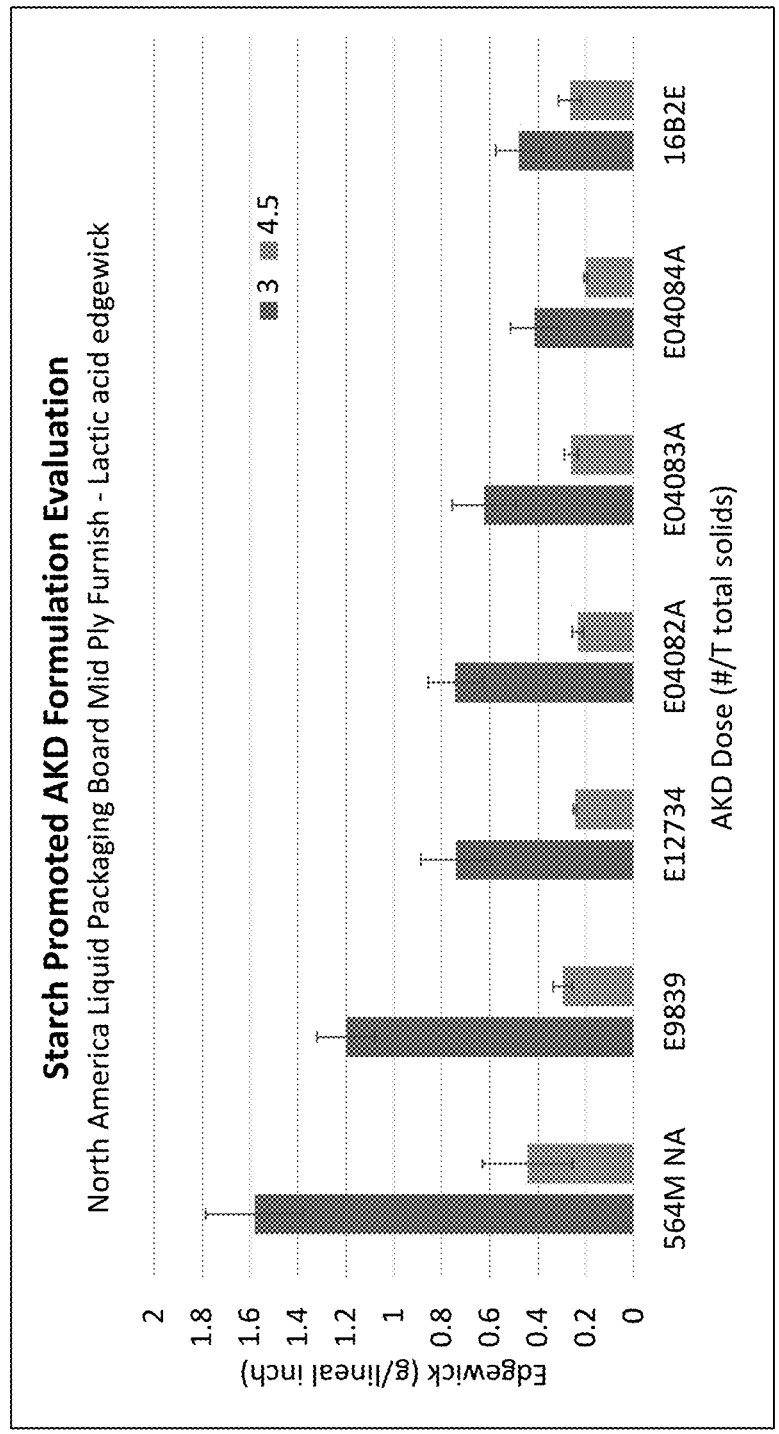
FIG. 5B provides an exemplary graph of lactic acid edgewick results from handsheets prepared by sizing liquid packaging board mid ply furnish with AKD formulations according to Example 6.

Handsheets formed from the sized furnish formulations were analyzed by Cobb sizing test according to Example 5, and by lactic acid edgewick testing. Cobb sizing test results are shown in FIG. 5A. Edgewick testing results are shown in FIG. 5B.

Lactic acid edgewick testing provides a measure of the amount of 20% aqueous lactic acid absorbed by a standard length of submerged edge of sheet or board. The lactic acid edge wicking test is typically used to ensure that packages containing milk and juice are resistant to liquid penetration. Results are expressed in grams of wicked fluid per lineal inch of submerged edge. Higher performance sizing emulsions produce sheets with lower absorptiveness.

Results indicate that the inventive liquid starch-promoted formulation (E04084A) provided the best Cobb sizing and edgewick results at both high and low dosing as compared to the other promoted AKD formulations and the unpromoted material (564M).

These results provide further proof of concept that the inventive method of adding liquid high-charge cationic starch in combination with PAC to a stabilized AKD emulsion increases the retention of AKD in the paper furnish, thus giving better sizing performance in the finished sheet at both lower and higher dosing.

Furthermore, the combined results of Examples 5 and 6 demonstrate that the inventive method may be generally used for multiple furnish types and papermaking applications.

Having described exemplary embodiments of the invention, the invention is further described in the claims which follow.

What is claimed is:

1. A method for preparation of a starch-promoted alkyl ketene dimer (AKD) sizing emulsion for the manufacture of paper or board, wherein the method comprises adding to a stabilized AKD emulsion comprising a cationic starch stabilizing agent:
   (a) a cationic starch sizing promoter, and
   (b) polyaluminum chloride (PAC)
   wherein addition of said cationic starch sizing promoter and PAC is effected
      (i) at temperature ranging from 22-27° C.;
      (ii) after emulsification, stabilization, and homogenization of said stabilized AKD emulsion comprising the cationic starch stabilizing agent; and
      (iii) prior to addition of the starch-promoted AKD sizing emulsion to papermaking furnish, pulp, or fiber stock,
   wherein the high-charge cationic starch sizing promoter comprises a percent nitrogen (% N) content ranging from 0.5% to 1.6% by mass.

2. The method of claim 1, wherein (i) said stabilized AKD emulsion is a homogenized stable emulsion comprising AKD, water, said cationic starch stabilizing agent, and optionally additional stabilizing agents selected from cationic polyacrylamides, copolymers of dialkylamine(s) and epichlorohydrin; polydiallylmethylammonium chloride (poly-DADMAC); poly(acrylamide-N-propyltrimethylammonium chloride (polyAPTAC); poly(methacrylamide-N-propyltrimethyl ammonium chloride (poly-MAPTAC); polyamidoamine epichlorohydrin resin, polyethyleneimine; polyvinylformamide/polyvinylamine; a copolymer of acrylamide and DADMAC; a copolymer of acrylamide and APTAC; a copolymer of acrylamide and MAPTAC; and mixtures thereof, and (ii) said cationic starch stabilizing agent comprises cooked cationic starch.

3. The method of claim 1, wherein said high-charge cationic starch sizing promoter is formulated separately by a method selected from:
   (a) dissolving a dry high-charge cationic starch comprising a percent nitrogen (% N) content ranging from 0.5% to 1.6% by mass in water, steam cooking or pot-cooking, and cooling to 22-27° C. to obtain a starch solution having percent solids ranging from 20% to 35% by mass; and
   (b) obtaining a liquid high-charge cationic starch solution having percent solids ranging from 20% to 35% by mass and a viscosity ranging from 5500 to 12000 cP.

4. The method of claim 1, wherein said cationic starch sizing promoter:
   (a) is selected from potato starch, waxy maize starch, tapioca starch, rice starch, wheat starch, barley starch, sweet potato starch, corn starch, and combinations thereof;
   (b) is added to said stabilized AKD emulsion to obtain a final starch dosage ranging from 1% to 7%, by weight on AKD, wherein % by weight on AKD refers to dry pounds of additive (e.g., starch) per dry pound of AKD in said stabilized AKD emulsion multiplied by 100%; and/or
   (c) is added to said stabilized AKD emulsion at said temperature ranging from 22-27° C. while agitating at a rate of 5000 rpm for a duration of 30 seconds followed by agitating until thoroughly incorporated.

5. The method of any one of claim 1, wherein PAC is added as an aqueous solution after addition of said sizing promoter comprising said cationic starch to obtain a final PAC dosage ranging from 2% to 20%, by weight on AKD and thoroughly incorporating to form a starch-promoted AKD sizing emulsion.

6. The method of any one of claim 1, wherein the pH of said starch-promoted AKD sizing emulsion ranges from 1.0 to 7.0.

7. The method of any one of claim 1, wherein said method further comprises obtaining a starch-promoted AKD sizing emulsion with decreased Cobb sizing or edgewick performance compared to unpromoted AKD sizing emulsions and AKD sizing emulsions promoted with polymeric cationic promoters selected from PolyDADMAC, PAE, cationic wet strength resins, and cationic starch with % N less than 0.5% by weight.

8. A method for preparation of a starch-promoted alkyl ketene dimer (AKD) sizing emulsion for the manufacture of paper or board, wherein the method comprises:
   (a) forming a cationic starch stabilizing agent by steam cooking or pot-cooking a cationic starch to form an aqueous starch solution;
   (b) adding to said cationic starch stabilizing agent a hydrophobic internal sizing agent comprising AKD wax pellets and/or molten AKD and agitating to form a thoroughly homogenized emulsion;
   (c) diluting said homogenized emulsion with water, optionally treating with additional cationic polymer stabilizing agents, agitating to form a homogenized emulsion, and cooling to 22-27° C. to form a stabilized AKD emulsion;
   (d) treating said stabilized AKD emulsion at temperature ranging from 22-27° C. with a sizing promoter comprising a cationic starch comprising a percent nitrogen (% N) content ranging from 0.5% to 1.6% by mass to obtain a final starch dosage ranging from 1% to 7%, by weight on AKD while agitating at a rate of 5000 rpm for a duration of 30 seconds followed by agitating until thoroughly incorporated; and
   (e) treating said thoroughly incorporated emulsion with an aqueous solution of PAC to obtain a final PAC dosage ranging from 2% to 20%, 5% to 16%, or 12% to 14% by weight on AKD and thoroughly incorporating to form a starch-promoted AKD sizing emulsion.

9. The method of claim 8, wherein said method further comprises obtaining a starch-promoted AKD sizing emulsion with decreased Cobb sizing or edgewick performance) compared to unpromoted AKD sizing emulsions and AKD sizing emulsions promoted with polymeric cationic promoters selected from PolyDADMAC, PAE, cationic wet strength resins, and cationic starch with % N content less than 0.5% by weight.

* * * * *